(12) United States Patent
Hamasaki et al.

(10) Patent No.: US 8,751,673 B2
(45) Date of Patent: Jun. 10, 2014

(54) AUTHENTICATION APPARATUS, AUTHENTICATION METHOD, AND DATA USING METHOD

(75) Inventors: Chizu Hamasaki, Kawasaki (JP); Tomotaka Endo, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 541 days.

(21) Appl. No.: 12/860,249

(22) Filed: Aug. 20, 2010

(65) Prior Publication Data

US 2010/0325296 A1    Dec. 23, 2010

Related U.S. Application Data

(63) Continuation of application No. PCT/JP2008/054389, filed on Mar. 11, 2008.

(51) Int. Cl.
G06F 15/16    (2006.01)

(52) U.S. Cl.
USPC ............................ 709/229; 709/227; 709/228

(58) Field of Classification Search
USPC ................................................ 709/227–229
See application file for complete search history.

(56) References Cited

U.S. PATENT DOCUMENTS

| | | | |
|---|---|---|---|
| 6,233,577 B1 * | 5/2001 | Ramasubramani et al. | 1/1 |
| 6,516,316 B1 * | 2/2003 | Ramasubramani et al. | 1/1 |
| 6,636,505 B1 * | 10/2003 | Wang et al. | 370/352 |
| 6,735,623 B1 * | 5/2004 | Prust | 709/219 |
| 6,804,752 B2 * | 10/2004 | Patterson et al. | 711/163 |
| 7,558,233 B2 * | 7/2009 | Annic | 370/328 |
| 7,606,560 B2 * | 10/2009 | Labrou et al. | 455/411 |
| 2001/0020241 A1 * | 9/2001 | Kawamoto et al. | 707/202 |
| 2001/0025878 A1 * | 10/2001 | Hendrick | 235/375 |
| 2003/0179406 A1 * | 9/2003 | Seto | 358/1.15 |
| 2004/0076120 A1 * | 4/2004 | Ishidoshiro | 370/252 |
| 2004/0111578 A1 * | 6/2004 | Goodman et al. | 711/163 |
| 2004/0157600 A1 * | 8/2004 | Stumpert et al. | 455/432.1 |
| 2006/0069914 A1 * | 3/2006 | Rupp et al. | 713/168 |

(Continued)

FOREIGN PATENT DOCUMENTS

| | | |
|---|---|---|
| JP | 2001-67319 | 3/2001 |
| JP | 2002-245389 | 8/2002 |

(Continued)

OTHER PUBLICATIONS

International Search Report dated Jun. 24, 2008, from the corresponding International Application.

(Continued)

*Primary Examiner* — Backhean Tiv
(74) *Attorney, Agent, or Firm* — Katten Muchin Rosenman LLP

(57) ABSTRACT

An apparatus for authenticating a request includes a receiving unit, an acquiring unit, a determining unit, and a permitting unit. The receiving unit receives a request for a service-related process from a service user via a communication device. The request contains process request information indicating the contents of the requested process and connection identification information unique to the communication device. The acquiring unit acquires the connection identification information contained in the received request. The determining unit determines whether the connection identification information acquired by the acquiring unit exactly corresponds to connection identification information of a communication device that has established an authorized connection. When the two pieces of the connection identification information are determined to exactly correspond to each other, the permitting unit permits performing a process that corresponds to the process request information, which is contained in the request received by the receiving unit.

9 Claims, 7 Drawing Sheets

(56) References Cited

U.S. PATENT DOCUMENTS

| | | | |
|---|---|---|---|
| 2007/0143229 A1* | 6/2007 | Delahaigue et al. | 705/72 |
| 2008/0195406 A1* | 8/2008 | Matsumoto | 705/1 |
| 2009/0119264 A1* | 5/2009 | Bostic et al. | 707/3 |
| 2009/0150640 A1* | 6/2009 | Royer et al. | 711/173 |
| 2009/0171977 A1* | 7/2009 | Park | 707/10 |
| 2010/0017599 A1* | 1/2010 | Sellars et al. | 713/156 |
| 2010/0325296 A1* | 12/2010 | Hamasaki et al. | 709/229 |
| 2011/0265173 A1* | 10/2011 | Naaman et al. | 726/8 |

FOREIGN PATENT DOCUMENTS

| | | |
|---|---|---|
| JP | 2003-324457 | 11/2003 |
| JP | 2004-201046 | 7/2004 |
| JP | 2006-31478 | 2/2006 |
| JP | 2006-217194 | 8/2006 |

OTHER PUBLICATIONS

Notice of Rejection dated Aug. 14, 2012, from corresponding Japanese Application No. 2010-502661.

* cited by examiner

REQUEST DURING LOG-IN

REQUEST WITHOUT LOG-IN

AUTHENTICATION APPARATUS, AUTHENTICATION METHOD, AND DATA USING METHOD

CROSS-REFERENCE TO RELATED APPLICATION(S)

This application is a continuation of International Application No. PCT/JP2008/054389, filed on Mar. 11, 2008, the entire contents of which are incorporated herein by reference.

FIELD

The embodiments discussed herein are directed to an authentication apparatus, an authentication method, and a data using method.

BACKGROUND

Recent increase in the variety of services provided on the Internet causes more and more data unique to the service users to be managed by a server device of a service provider. For example, on-line shopping sites using the Internet manage information on ordered items and payment with respect to each service user. For example, Japanese Laid-open Patent Publication No. 2006-31478 discloses a technology in which an authentication server apparatus manages the telephone numbers and passwords of service users and a contents server device provides contents, such as music data, only to authorized service users. When a server device that is accessed by service users manages data unique to each service user, user authentication is generally performed using a login name or a password for each service user so that security is ensured.

When the service as described above is used, data is sometimes cached by a terminal device, such as a personal computer that a service user uses, or a server device with which a service provider is provided so as to eliminate time-consuming operations, such as inputting a login name by a service user, and to improve the convenience. Specifically, for example, by caching the login name and the password of the service user for a specific site in the terminal device, the service user can automatically log in only by accessing the site and refer to the service usage history unique to the service user.

However, while the use of a cache can realize highly convenient services, it also causes a problem of weak security of data unique to service users, which is managed by the server device. For example, in an environment in which service users share one terminal device, if the login names and the passwords of the service users have been cached in the terminal device, the login name or the password unique to a service user may be referred to by other service users. Furthermore, other service users may not only refer to the data but also use services that require a charging process.

To prevent such events, service users can choose whether or not to cache data in the terminal device or the server device. However, if a service user chooses to stop caching data, the service user has to input a login name and a password in order to log in each time the service user accesses the server device, which reduces service convenience. In addition, it is considered that who stops caching data is generally only the service users who know the risk of caching data. Thus it is difficult to securely protect service users who use services without considering a cache, such as beginner users of personal computer.

SUMMARY

According to an aspect of an embodiment of the invention, an apparatus for authenticating a request, the apparatus includes: a receiving unit that receives a request which is transmitted via a communication device by a service user to request a service-related process, the request containing process request information and connection identification information, the process request information indicating the contents of the process that the service user requests and the connection identification information being unique to the communication device; an acquiring unit that acquires the connection identification information that is contained in the request, which is received by the receiving unit; a determining unit that determines whether the connection identification information, which is acquired by the acquiring unit, exactly corresponds to connection identification information of a communication device that has established a connection that allows authorized use of the service; and a permitting unit that permits performing a process that corresponds to the process request information, which is contained in the request received by the receiving unit, when the result of the determination by the determining unit indicates that the two pieces of the connection identification information exactly correspond to each other.

According to another aspect of an embodiment of the invention, a method for authenticating a request, the method includes: receiving a request which is transmitted via a communication device by a service user to request a service-related process, the request containing process request information and connection identification information, the process request information indicating the contents of the process that the service user requests and the connection identification information being unique to the communication device; acquiring the connection identification information that is contained in the request, which is received at the receiving; determining whether the connection identification information, which is acquired at the acquiring, exactly corresponds to connection identification information of a communication device that has established a connection that allows authorized use of the service; and permitting performing a process that corresponds to the process request information, which is contained in the request received at the receiving, when the result of the determining indicates that the two pieces of the connection identification information exactly correspond to each other.

According to still another aspect of an embodiment of the invention, a data using method for using data for a service that is provided via connection that is established by a communication device on a network, the data using method includes: securing an individual storage area that is individually associated with the communication device when the communication device establishes connection that allow authorized use of the service; receiving process request information that indicates contents of a process that a service user requests from a user communication device that the service user uses; acquiring connection identification information unique to the user communication device when the process request information is received at the receiving; determining whether the connection identification information, which is acquired at the acquiring, exactly corresponds to connection identification information of a communication device that has established a connection that allows authorized use of the service; and permitting performing a process that uses data stored in the individual storage area, which is secured at the securing, and that corresponds to the process request information, which is received at the receiving, when the result of the determining indicates that the two pieces of the connection identification information exactly correspond to each other.

The object and advantages of the embodiment will be realized and attained by means of the elements and combinations particularly pointed out in the claims.

It is to be understood that both the foregoing general description and the following detailed description are exemplary and explanatory and are not restrictive of the embodiment, as claimed.

DESCRIPTION OF EMBODIMENT(S)

According to an aspect of the present invention, a storage area is allocated to an authorized user who is permitted to log in to a server device of a service provider, the allocated storage area can be used by only one individual while a session is in progress; an authentication process is performed to authenticate a request from a user based on identification information unique to a communication device that continues the session; and processes corresponding to the authenticated request are performed using the individual storage area. Preferred embodiments of the present invention will be explained below with reference to accompanying drawings.

Figure 1:
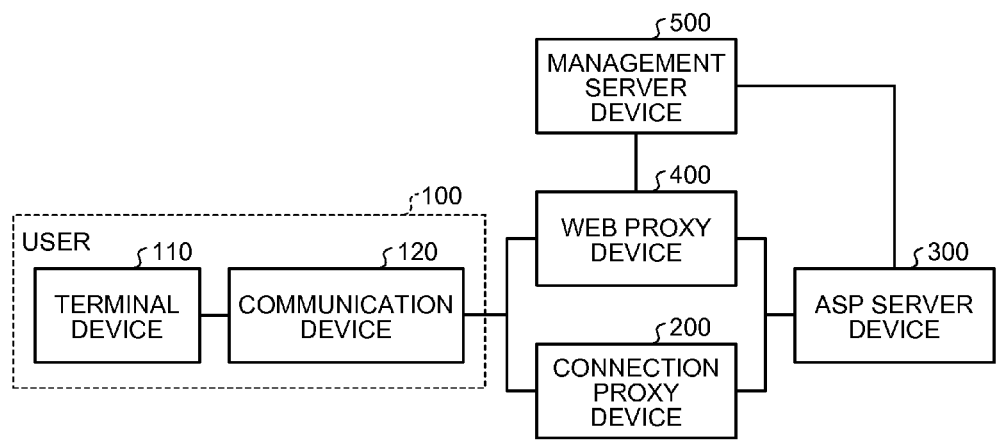
FIG. 1 is a block diagram of an overall configuration of a network according to an embodiment of the present invention.

FIG. 1 is a block diagram of an overall configuration of a network according to an embodiment of the present invention. The network illustrated in FIG. 1 includes a user 100, a connection proxy device 200, an application service provider (ASP) server device 300, a web proxy device 400, and a management server device 500.

The user 100 includes a terminal device 110 and a communication device 120. The user 100 transmits a request for data to the ASP server device 300 and the management server device 500, and receives data corresponding to the request. Specifically, the terminal device 110 is a personal computer that a service user operates. The terminal device 110 receives data corresponding to the request. Specifically, the terminal device 110 is, for example, a personal computer that the service user operates. The terminal device 110 accepts inputs of, for example, a request from the service user. The terminal device 110 acquires data that the service user requires and displays or reproduces the data such that the service user can refer to it. The terminal device 110 receives and transmits requests and data from and to the ASP server device 300 and the management server device 500 via the communication device 120 and the web proxy device 400.

The communication device 120 is, for example, a service user's mobile phone. The communication device 120 has communication device information, such as a unique production number, and identification information, such as a telephone number or a session initiation protocol-uniform resource locator (SIP-URL). When the communication device 120 is connected to the terminal device 110, the communication device 120 establishes a session between the user 100 and the ASP server device 300 in response to an operation performed by the service user. To establish a session, the communication device 120 requests the connection proxy device 200 to establish a session with the ASP server device 300. The session is established as described so that the user 100 can communicate with the ASP server device 300 and the management server device 500 via the web proxy device 400. During the session, the communication device 120 attaches a connection ID, which contains communication device information and identification information of the communication device 120, to the requests from the terminal device 110, and then transmits the request, to which the connection ID is attached, to the web proxy device 400.

Instead of mobile phones, for example, a wireless LAN card or a land phone, may be used for the communication device 120. Any device can be used that can request the connection proxy device 200 to establish a session so that the user 100 can communicate with the ASP server device 300 via the web proxy device 400.

The connection proxy device 200 is, for example, an SIP proxy. The connection proxy device 200 establishes and disconnects the session between the user 100 and the ASP server device 300. Specifically, before the connection proxy device 200 establishes or disconnects a session, the connection proxy device 200 notifies that a session is to be established or a session is to be disconnected to the communication device 120 and the ASP server device 300. When both the communication device 120 and the ASP server device 300 accept establishment or disconnection of a session, the connection proxy device 200 establishes or disconnects a session.

The ASP server device 300 is a server with which the service provider is provided. The ASP server device 300 provides services using a predetermined application to the user 100. Upon receiving a request for a log-in from the user 100, the ASP server device 300 determines whether to permit a log-in according to the login name and the password and then transmits the result of the determination to the web proxy device 400 and the management server device 500 as login information. Furthermore, when the ASP server device 300 uses data unique to the user 100, the ASP server device 300 acquires data from an individual storage area for the user 100, which is allocated in the management server device 500, or stores data in the storage area.

The web proxy device 400 receives a request for data or a process from the user 100 and transmits the request to the ASP server device 300 or the management server device 500 depending on the contents of the request. After the user 100 logs in, the web proxy device 400 determines whether the user 100 is authentic using the connection ID that is contained in the request. The configuration of the web proxy device 400 will be described in detail later.

The management server device 500 has a storage area for storing data on users. For example, when the user 100 logs in to the ASP server device 300, the management server device 500 generates a storage area in which data unique to the user 100 is individually stored (hereinafter, "individual area"). The management server device 500 then provides the data unique to the user 100, which is stored in the individual area, to the user 100 and the ASP server device 300. Once the session between the user 100 and the ASP server device 300 is disconnected, the management server device 500 deletes the individual area in which the data unique to the user 100 is stored. The configuration of the management server device 500 will be explained in detail later.

The data unique to the user 100, which is stored in the individual area, includes the service user's purchasing history and payment information, the service user's personal information, information on registered mail magazines that the service user wants to receive, and the service user's personnel/account information. These kinds of data should be referred to and updated only by the service user and the data contains information that should be prevented from being leaked to users other than the user 100.

Figure 2:
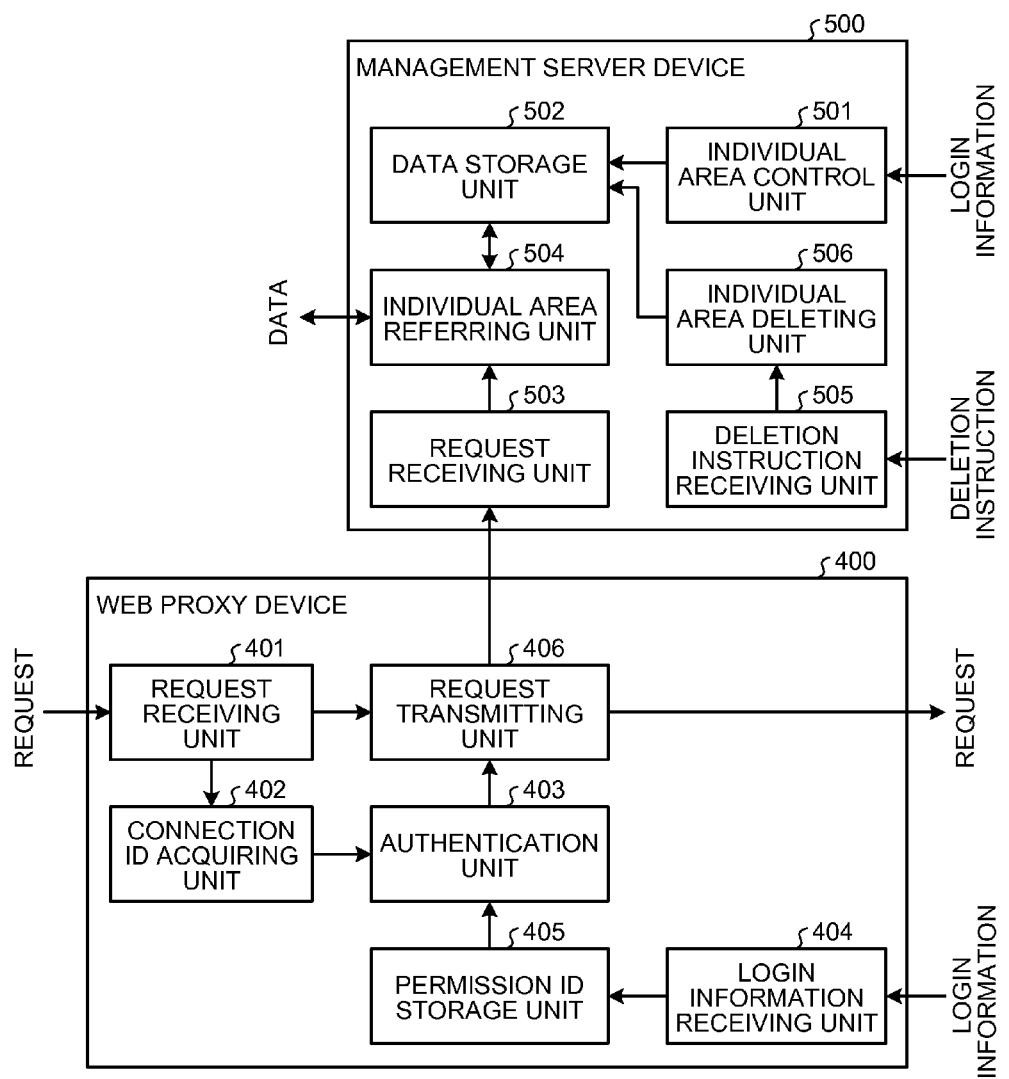
FIG. 2 is a block diagram of a configuration of the main part of a web proxy device and a management server device according to the embodiment.

FIG. 2 is a block diagram of a configuration of the main part of the web proxy device 400 and the management server device 500 according to the embodiment. The web proxy device 400 illustrated in FIG. 2 includes a request receiving unit 401, a connection ID acquiring unit 402, an authentication unit 403, a login information receiving unit 404, a permission ID storage unit 405, and a request transmitting unit 406.

Figure 3A:
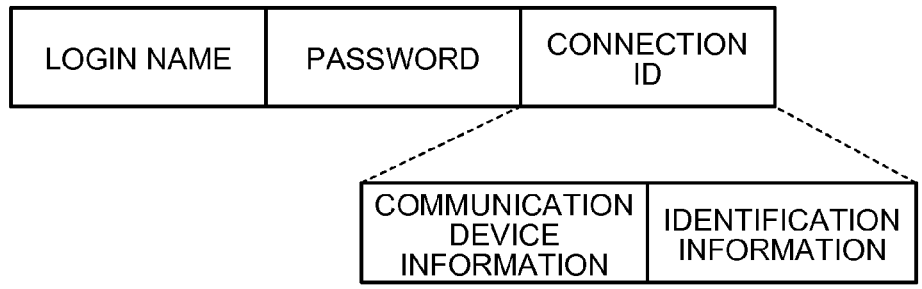
FIGS. 3A and 3B are diagrams illustrating a specific example of a format of a request according to the embodiment.
Figure 3B:

The request receiving unit 401 receives a request that is transmitted from the user 100. More specifically, the request receiving unit 401 receives a request, in which the connection ID of the communication device 120 is added to the request for performing a process or a request for accessing data. The request is input by the service user by operating the terminal device 110. Specifically, for example, when the service user wants to log in to the ASP server device 300, the request receiving unit 401 receives the request, in which the connection ID of the communication device 120 is added to the login name and the password input by the service user to the terminal device 110, as illustrated in FIG. 3A. Except when the user 100 logs in, the request receiving unit 401 receives a request in which the connection ID of the communication device 120 is added to a process request, which is input by the service user to the terminal device 110, as illustrated in FIG. 3B.

The connection ID of the communication device 120 contains, as described above, communication device information, such as the product number unique to the communication device 120, and identification information, such as the telephone number of the communication device 120. As the connection ID, any one of or both of the communication device information and the identification information may be used, or a hash value that is obtained using a predetermined function for those types of information may be used.

The connection ID acquiring unit 402 acquires the connection ID that is added to the request, which is received by the request receiving unit 401. The connection ID acquiring unit 402 outputs the acquired connection ID to the authentication unit 403.

The authentication unit 403 determines whether the connection ID, which is acquired by the connection ID acquiring unit 402, is stored in the permission ID storage unit 405. When the connection ID is stored in the permission ID storage unit 405, the authentication unit 403 authenticates the request from the user 100. The authentication unit 403 then notifies the request transmitting unit 406 of the result of the determination indicating whether the request from the user 100 is authenticated.

The login information receiving unit 404 receives the login information indicating whether the user 100 is permitted to log in from the ASP server device 300. The login information, which the login information receiving unit 404 receives, contains the result of the determination of whether the user 100 is permitted to log in and also contains the connection ID that is added to the request from the user 100.

Figure 4:
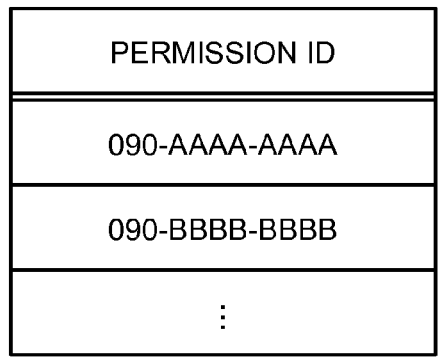
FIG. 4 is a diagram illustrating a specific example of a permission ID according to the embodiment.

The permission ID storage unit 405 stores the connection ID, which is contained in the login information indicating that the login is permitted, as a permission ID with which transmission of a request to the ASP server device 300 and the management server device 500 is permitted. In other words, the permission ID storage unit 405 stores, as a permission ID, the connection ID that is added to the request, as illustrated in FIG. 4, from the authorized user who has logged in to the ASP server device 300. In the example illustrated in FIG. 4, the telephone number of the communication device 120 is used as a connection ID.

The request transmitting unit 406 transmits the request from the user 100, which is authenticated by the authentication unit 403, to the ASP server device 300 or the management server device 500. In other words, the request transmitting unit 406 transmits the request, which is received by the request receiving unit 401, to the ASP server device 300 or the management server device 500 only when the authentication unit 403 outputs the result of an authentication indicating that a request from the user 100 has been authenticated.

When the request, which is received by the request receiving unit 401, is a request for a log-in, the request transmitting unit 406 transmits the request to the ASP server device 300 regardless of the result of the authentication, which is made by the authentication unit 403. When the user 100 is authenticated and the request that is received by the request receiving unit 401 is a request related to the data unique to the user 100, the request transmitting unit 406 transmits the request to the management server device 500. When the user 100 is authenticated and the request that is received by the request receiving unit 401 is a normal request that is not related to the data unique to the user 100, the request transmitting unit 406 transmits the request to the ASP server device 300.

The management server device 500 includes an individual area control unit 501, a data storage unit 502, a request receiving unit 503, an individual area referring unit 504, a deletion instruction receiving unit 505, and an individual area deleting unit 506.

The individual area control unit 501 receives the login information indicating whether the user 100 is permitted to log in from the ASP server device 300. When the login of the user 100 is permitted, the individual area control unit 501 generates or opens the individual area for the user 100. In other words, when the user 100 logs in for the first time after the user 100 started communications using the communication device 120, the individual area control unit 501 generates an individual area for the user 100 in the data storage unit 502. When the user 100 logs in for the second and subsequent times after the user 100 started communications using the communication device 120, the individual area control unit 501 opens the individual area for the user 100 that has been already generated in the data storage unit 502. In other words, the individual area control unit 501 makes the individual area for the user 100 to be usable when the user 100 is permitted to log in.

The data storage unit 502 includes a storage area for storing data. When the individual area control unit 501 generates the individual area for the user 100, the data storage unit 502 allocates a part of the storage area to the data unique to the user 100. When the individual area deleting unit 506 deletes the individual area for the user 100, the individual area for the user 100 is turned back to a general-purpose storage area that can be used as an individual area for another user.

The request receiving unit 503 receives, from the web proxy device 400, a request that is related to the data unique to the user 100 and that has been authenticated. In other words, the request receiving unit 503 receives requests that contain, for example, a request for accessing the service user's personal information or a request for updating the service user's personal information.

The individual area referring unit 504 refers to the individual area for the user 100, which is generated in the data storage unit 502, stores data in the individual area, or acquires data from the individual area in accordance with the request that is received by the request receiving unit 503. The individual area referring unit 504 transmits the data, which is acquired from the individual area for the user 100, to the user 100 via the web proxy device 400. When the ASP server device 300 uses the data unique to the user 100, the individual area referring unit 504 acquires the data from the individual area for the user 100 and transmits the data to the ASP server device 300.

When the session between the user 100 and the ASP server device 300 is disconnected, the deletion instruction receiving unit 505 receives an instruction for deleting the individual area, which is transmitted from the communication device 120 and the ASP server device 300. In other words, the communication device 120 and the ASP server device 300 transmit a deletion instruction for deleting the individual area for the user 100 upon being notified by the connection proxy device 200 that the session is to be disconnected, and the deletion instruction receiving unit 505 then receives the deletion instruction for deleting the individual area for the user 100.

The individual area deleting unit 506 deletes the individual area corresponding to the deletion instruction, which is received by the deletion instruction receiving unit 505, from the data storage unit 502. In other words, the individual area deleting unit 506 turns back the individual area for the user 100, which is specified by the deletion instruction, to a general-purpose storage area that is not an individual area for a specific user.

Figure 5:
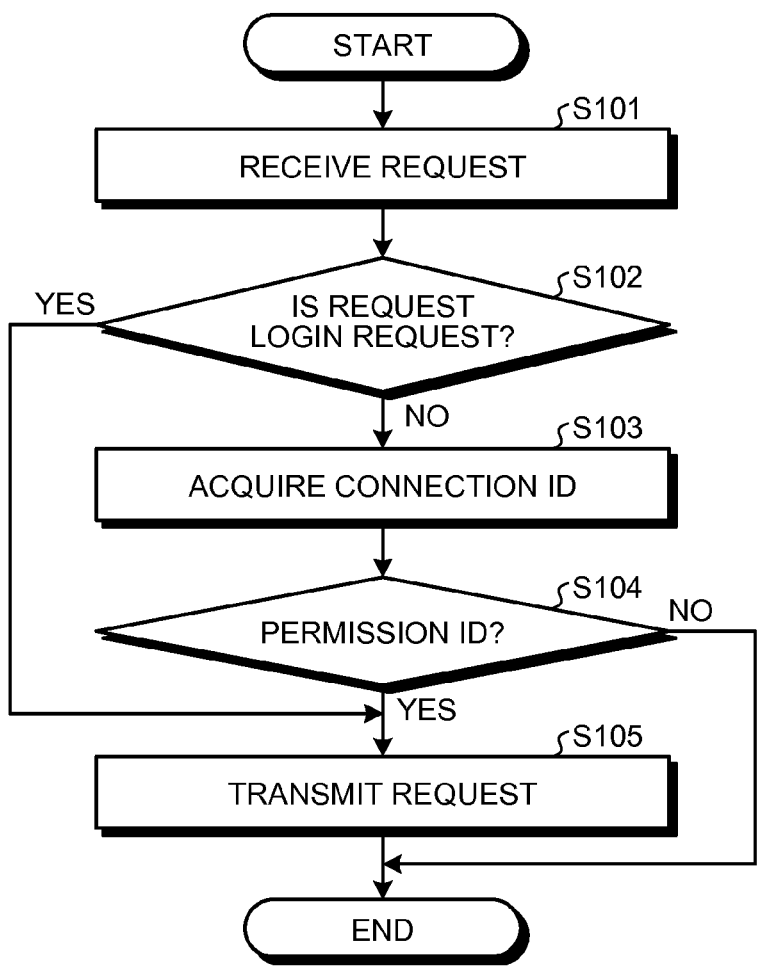
FIG. 5 is a flowchart of operations of the web proxy device according to the embodiment.

Operations of the web proxy device 400 and the management server device 500, which are configured as described above, will be explained below. First, operations of the web proxy device 400 will be explained with reference to the flow chart illustrated in FIG. 5. In the following explanation, it is assumed that the connection proxy device 200 has already established a session between the user 100 and the ASP server device 300 in response to a request from the communication device 120.

When the service user performs an operation for a login request or a data access request using the terminal device 110, the connection ID of the communication device 120 is added to the request and the request is then transmitted as a request of the user 100. The request is received by the request receiving unit 401 of the web proxy device 400 (step S101). The request is then output to the request transmitting unit 406 and it is determined whether the request is a login request that contains the service user's login name and password (step S102).

When the result of the determination indicates that the request is for a log-in (YES at step S102), the login name and the password, which are contained in the request, are transmitted from the request transmitting unit 406 to the ASP server device 300 without a condition (step S105). Thereafter, the ASP server device 300 determines whether to permit the user 100 to log in according to the login name and the password, which are contained in the request, and transmits the result of the determination and the connection ID, which is added to the request, as login information to the web proxy device 400 and the management server device 500. In the web proxy device 400, the connection ID that is contained in the login information, which indicates that a log-in has been permitted, is stored in the permission ID storage unit 405. Thus, requests that are issued thereafter, to which the connection ID stored in the permission ID storage unit 405 is added, are determined to be authentic as requests from the authorized user.

In contrast, when the result of the determination by the request transmitting unit 406 indicates that the request is not a request for a log-in (NO at step S102), the connection ID acquiring unit 402 acquires the connection ID, which is added to the request, (step S103) and outputs the connection ID to the authentication unit 403. The authentication unit 403 then determines whether a connection ID identical to the ID that is added to the request is stored in the permission ID storage unit 405 (step S104).

When the connection ID is stored in the permission ID storage unit 405 (YES at step S104), it is determined that the request, which is received by the request receiving unit 401, is a request that is transmitted, using the communication device 120 that was being used when the permission for a log-in was made, from a service user who has been permitted to log in. Therefore, the request is determined to be an authentic request from the authorized user. Thereafter, the request transmitting unit 406 determines whether the contents of the request are related to the data unique to the user. When the contents of the request are related to the data unique to the user, the request is transmitted to the management server device 500. In contrast, when the contents are not related to the data unique to the user, the request is transmitted to the ASP server device 300 (step S105).

When the result of the determination by the authentication unit 403 indicates that the connection ID, which is added to the request, is not stored in the permission ID storage unit 405 (NO at step S104), it is determined that the request, which is received by the request receiving unit 401, is a request from a user who has not been permitted to log in or a request that is transmitted using a communication device that is different from the communication device 120 that was being used when the permission for a log-in was made. Therefore, the request is not authenticated and is not transmitted to the ASP server device 300 or the management server device 500. In this case, for example, an error process for, for example, displaying an error message on the terminal device 110, is performed in response to an instruction from the web proxy device 400.

When the ASP server device 300 permits the user 100 to log in, the web proxy device 400 according to the embodiment stores the connection ID of the communication device 120, which was added to the request for a log-in. Thus, only requests that contain a connection ID identical to the request, which was added to the request for a log-in, among subsequent requests from the user 100 are authenticated. Accordingly, not only determination by the ASP server device 300 on whether a user is authentic using the login name and the password, but also determination on whether requests are authentic using the connection ID of the communication device 120 are performed.

Because the connection ID of the communication device 120 is automatically added to a request when the request is transmitted from the user 100, the service user who operates the terminal device 110 is not required to perform special operations for adding the connection ID to the request. Therefore, it is unnecessary for the service user to consider authentication of requests and, for example, even when the service user is switched to another service user while the login name and the password for the first service user remain cached in the terminal device 110, the request made by the second service user would not be authenticated as far as the second service user uses a different communication device 120 and a different connection ID is added to the request.

Figure 6:
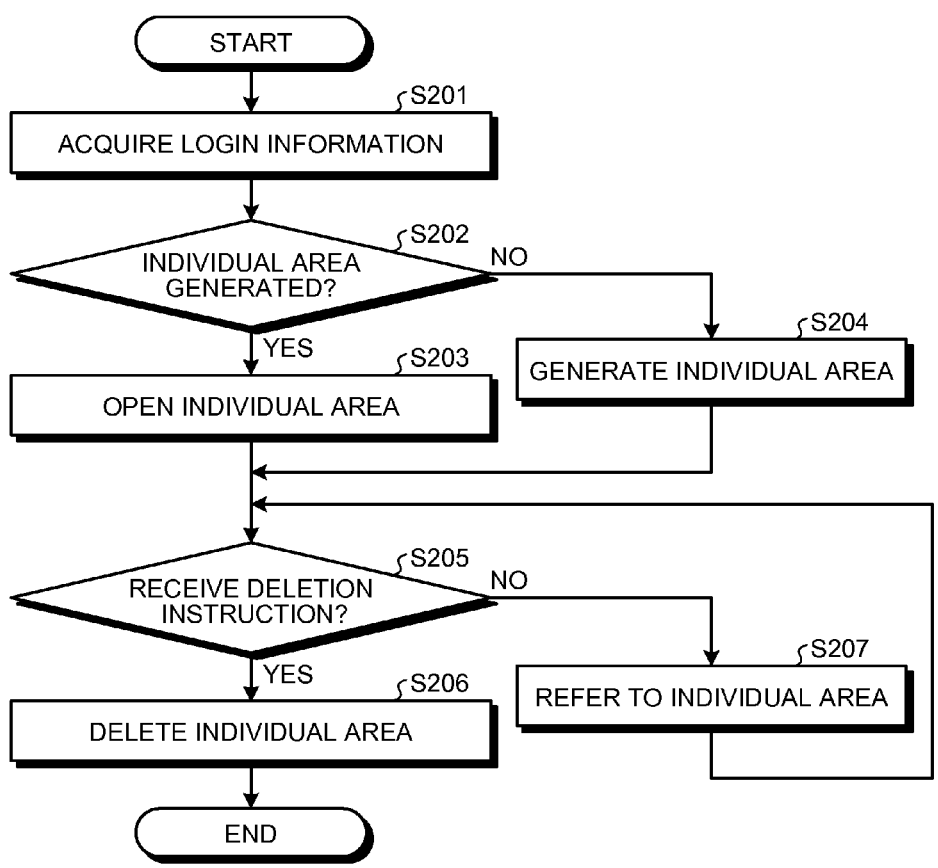
FIG. 6 is a flowchart of operations of the management server device according to the embodiment.

Operation of the management server device 500 will be explained with reference to the flowchart illustrated in FIG. 6. In the following explanation, it is assumed that the connection proxy device 200 has already established a session between the user 100 and the ASP server device 300 in response to a request from the communication device 120.

As described above, when a request that contains the login name and the password for the service user is transmitted from the user 100, the ASP server device 300 transmits login information that indicates whether a log-in is permitted and that contains the connection ID, which is added to the request, to the management server device 500. The login information is acquired by the individual area control unit 501 of the management server device 500 (step S201). The individual area control unit 501 then determines whether the individual area corresponding to the connection ID, which is contained in the login information, has been already generated in the data storage unit 502 (step S202).

When the service user logs in for the first time after establishing a connection with the ASP server device 300 using the communication device 120, no individual area for the user 100 has been generated in the data storage unit 502. In contrast, when the service user logs in for the second or subsequent times, if a session with the ASP server device 300 is not disconnected after the service user is connected to the ASP server device 300 using the communication device 120, an individual area for the user 100 has been already generated in the data storage unit 502. Thus, when the service user logs in for the first time after establishing a session, the individual area control unit 501 determines that no individual area for the user 100 has been generated. In contrast, when the service user logs in for the second or subsequent times after establishing a session, the individual area control unit 501 determines that an individual area for the user 100 has been already generated.

When it is determined that an individual area has been generated (YES at step S202), the individual area control unit 501 opens the individual area for the user 100 in the data storage unit 502 and thus the individual area can be used (step S203). In other words, the data stored in the individual area for the user 100 can be referred to or updated in accordance with the request from the user 100. The data can be referred to or updated when the request receiving unit 503 receives a request that is authenticated by the web proxy device 400 using the connection ID, and the individual area referring unit 504 refers to the individual area for the user 100.

When it is determined that no individual area has been generated (NO at step S202), the individual area control unit 501 generates, in the data storage unit 502, an individual area that corresponds to the connection ID contained in the login information (step S204). Accordingly, the individual area for the user 100 can be allocated in the data storage unit 502 until the session between the communication device 120 and the ASP server device 300 is disconnected. In other words, while the session continues, the service user can securely communicate information unique to the service user between the user 100 and the ASP server device 300 by using the individual area for the user 100.

After the individual area is opened or generated, the deletion instruction receiving unit 505 constantly monitors whether an instruction for deleting the individual area from the communication device 120 and the ASP server device 300 is received (step S205). In other words, when the session between the communication device 120 and the ASP server device 300 is disconnected, the communication device 120 and the ASP server device 300 detect the start of disconnection of the session because of a notification by the connection proxy device 200, and a deletion instruction for deleting the individual area corresponding to the connection ID of the communication device 120 is then transmitted to the management server device 500. Accordingly, when the session is disconnected, the deletion instruction receiving unit 505 receives the deletion instruction from the communication device 120 and the ASP server device 300.

When the deletion instruction receiving unit 505 receives the deletion instruction (YES at step S205), the individual area deleting unit 506 deletes the individual area for the user 100 that has the communication device 120 (step S206). In other words, when the session between the communication device 120 and the ASP server device 300 is disconnected, the individual area for the user 100 is deleted and the storage area is turned back to a general-purpose storage area that can be used as an individual area for another user. As a result, the data unique to the user 100 is not referred to by other users after the session is disconnected. The service user is not required to perform a special operation in order to delete the individual area for the user 100. Thus, the service user can securely use the data unique to the service user using the individual area while the session continues, and the service user can delete the individual area easily at the disconnection of the session.

When the deletion instruction receiving unit 505 does not receive the deletion instruction (NO at step S205), the session continues. Therefore, the individual area referring unit 504 repeatedly refers to the individual area in response to only requests that are received by the request receiving unit 503 and that are authenticated (step S207). When the deletion instruction receiving unit 505 receives the deletion instruction while the individual area referring unit 504 repeatedly refers to the individual area (YES at step S205), the individual area deleting unit 506 deletes the individual area as described above (step S206).

When the ASP server device 300 permits the user 100 to log in, the management server device 500 according to the embodiment allocates, in the data storage unit 502, the individual area corresponding to the connection ID of the communication device 120, which is added to the request for a log-in. Thereafter, when the user 100 issues a request, the data unique to the user 100 is used using the individual area. When the session between the communication device 120 of the user 100 and the ASP server device 300 is disconnected, the individual area for the user 100 is deleted. Accordingly, while the session by the communication device 120 continues, the data unique to the user 100 can be used securely by using the individual area. In addition, after the communication device 120 disconnects the session, the data unique to the user 100 can be prevented from being used by other users because the individual area is deleted.

Figure 7:
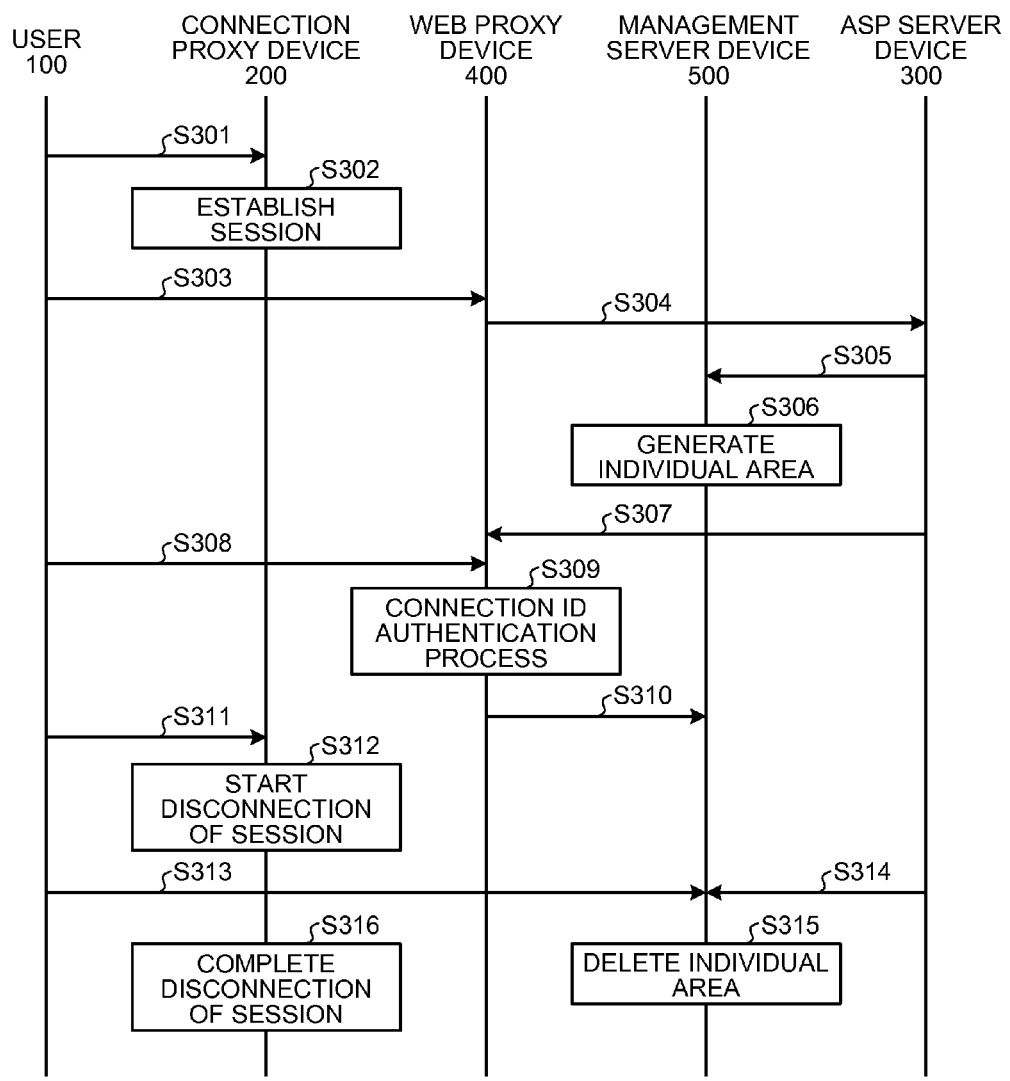
FIG. 7 is a sequence chart of a data using method according to the embodiment.

A data using method using the data unique to the user 100 according to the embodiment will be explained below with reference to the sequence chart of FIG. 7. The data using method illustrated in FIG. 7 includes authentication of a request by the web proxy device 400 and generation and deletion of the individual area by the management server device 500.

First, when the service user wants to connect with the ASP server device 300, the communication device 120 of the user 100 transmits a session establishment request to the connection proxy device 200 (step S301). When the connection proxy device 200 receives the transmitted session establishment request, a predetermined session establishing process for requesting session establishment to the ASP server device 300 is performed (step S302) and a session is then established between the communication device 120 and the ASP server device 300. Accordingly, the user 100 can transmit requests to the ASP server device 300 or the management server device 500 via the web proxy device 400.

The user 100 then transmits a request, in which the connection ID of the communication device 120 is added to the service user's login name and the password, in order to log in to the ASP server device 300 (step S303). The session establishment request and the request for a log-in from the user 100 may be transmitted collectively after the login name and the password are input by the service user by operating the terminal device 110. The request for a log-in, which is transmitted from the user 100, is transmitted to the ASP server device 300 via the request receiving unit 401 and the request transmitting unit 406 of the web proxy device (step S304).

When the ASP server device 300 receives the request, the ASP server device 300 determines whether to permit the service user to log in according to the login name and the password. Login information that indicates whether a log-in is permitted and that contains a connection ID, which is added to the request, is transmitted to the management server device 500 (step S305). It is assumed login information indicating that the user 100 is permitted to log in is transmitted. The login information is received by the individual area control unit 501 of the management server device 500. Because the user 100 is permitted to log in, the individual area corresponding to the connection ID of the communication device 120 is generated in the data storage unit 502 (step S306).

The ASP server device 300 transmits the login information indicating that the user 100 is permitted to log in also to the web proxy device 400 (step S307). The login information is then received by the login information receiving unit 404 of the web proxy device 400. The permission ID storage unit 405 stores the connection ID that is contained in the login information. Accordingly, the connection ID of the communication device 120 is stored as a permission ID which enables requests to be permitted.

Thereafter, when the user 100 transmits a request for using unique data, such as personal information (step S308), the request is received by the request receiving unit 401 of the web proxy device 400. The connection ID of the communication device 120 is automatically added to the request. The connection ID acquiring unit 402 acquires the connection ID, which is added to the request received by the request receiving unit 401, and the authentication unit 403 performs an authentication process on the connection ID (step S309). In other words, it is determined whether the connection ID that is added to the request has been stored in the permission ID storage unit 405. In this case, because the connection ID of the communication device 120 has been already stored in the permission ID storage unit 405, explanation will be given assuming that the authentication unit 403 authenticates the request.

When the authentication unit 403 authenticates the request, the request transmitting unit 406 determines whether the contents of the request are related to the data unique to the user 100. Because the request is related to the unique data, such as personal information, the request is transmitted to the management server device 500 (step S310). The request receiving unit 503 of the management server device 500 then receives the request that is transmitted from the request transmitting unit 406. The individual area referring unit 504 refers to the individual area in the data storage unit 502 corresponding to the connection ID, which is added to the request, and the data unique to the user 100 is used. If the request is not related to the data unique to the user 100, the request transmitting unit 406 of the web proxy device 400 transmits the request to the ASP server device 300 and the ASP server device 300 then performs a process. Depending on the contents of the request, the request may be transmitted to each of the ASP server device 300 and the management server device 500 and the ASP server device 300 may perform a process referring to the individual area for the user 100 in the management server device 500.

When the service user completes communications with the ASP server device 300, the communication device 120 of the user 100 transmits a session disconnection request to the connection proxy device 200 (step S311). When the connection proxy device 200 receives the transmitted session disconnection request, a predetermined session disconnection process for requesting the disconnection of the session to the ASP server device 300 is started (step S312). The session disconnection process allows the communication device 120 of the user 100 and the ASP server device 300 to detect that the session is going to be disconnected soon, and an instruction for deleting the individual area for the user 100 is transmitted to the management server device 500 (steps S313 and S314).

The deletion instruction receiving unit 505 of the management server device 500 receives the instruction for deleting the individual area, and the individual area deleting unit 506 deletes the individual area for the user 100 in the data storage unit 502 (step S315). This eliminates the risk that the data unique to the user 100, which is stored in the individual area for the user 100, is referred to by other users. The session disconnection process by the connection proxy device 200 is simultaneously performed while the individual area is deleted in the management server device 500. When the session disconnection process by the connection proxy device 200 is completed (step S316) and the individual area is deleted in the management server device 500, the session between the communication device 120 of the user 100 and the ASP server device 300 is disconnected.

As described above, when the service user is permitted to log in, the connection ID of the communication device 120, which is added to the request from the service user, is stored as a permission ID in the web proxy device 400 and the storage area that a service user can use individually is generated in the management server device 500. The web proxy device 400 authenticates subsequent requests from the service user according to the connection ID. When an authenticated request is related to the data unique to the service user, the data is used using the individual storage area in the management server device 500. When the session, which has been established by the communication device 120, is disconnected, the individual storage area that is generated in the management server device 500 is deleted. In other words, once the service user establishes a session using user's own communication device, an individual area that allows secure data use can be generated and each request can be authenticated without special operations. As a result, for the services on the network, the data unique to the service user can be used securely and reliably without reducing convenience to the service user.

In the first embodiment, when the session between the communication device 120 and the ASP server device 300 is disconnected, the communication device 120 and the ASP server device 300 transmit the instruction for deleting the individual area. Even when the session is not disconnected, the instruction for deleting the individual area may be transmitted from the user 100 when the service user desires.

Furthermore, security can be further increased by configuring the ASP server device 300 to transmit the instruction for deleting the individual area when a predetermined time period has passed without any access of the user 100 to the ASP server device 300. Operations of the ASP server device 300 that are performed when transmitting a deletion instruction will be explained with reference to the flowchart of FIG. 8.

Figure 8:
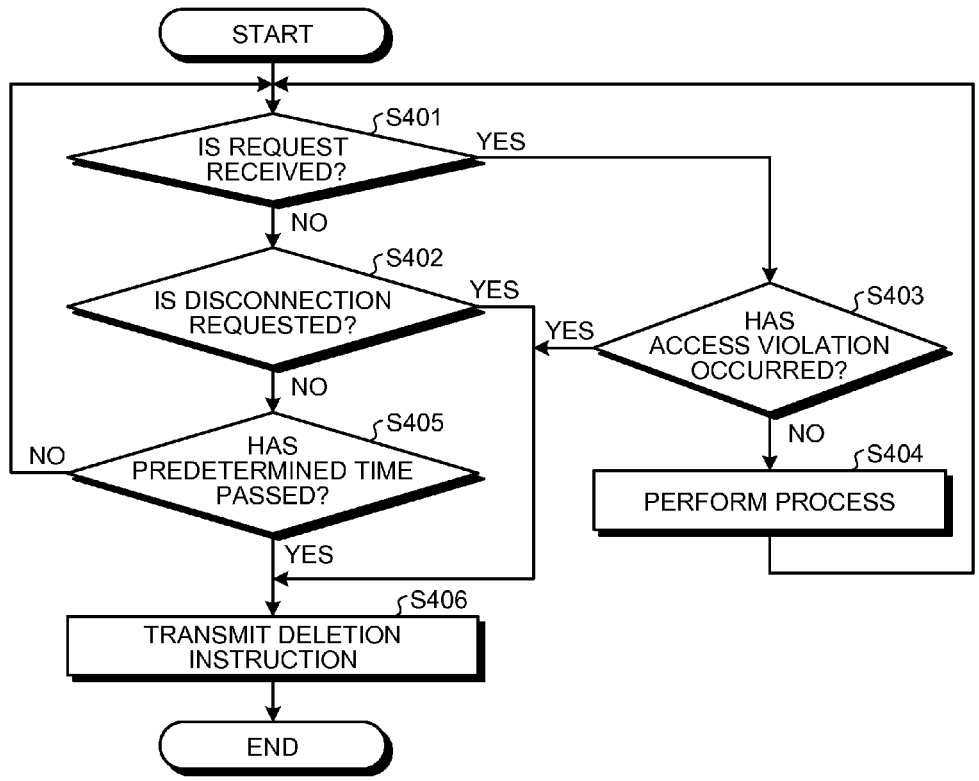
FIG. 8 is a flowchart of operations of an ASP server device according to the embodiment.

As illustrated in FIG. 8, the ASP server device 300 continuously waits for a request that is transmitted from the web proxy device 400 (step S401). When a request from the user 100 is received (YES at step S401), the ASP server device 300 performs a process corresponding to the request. If the request is for a log-in, it is determined whether access violation, such as an invalid login request, has occurred (step S403).

When multiple requests that contain the login name and the password for the service user, which has already logged in, are received, it can be assumed that a third party has logged in using the login name and the password for the authorized service user. Thus, it is determined that access violation has occurred (YES at step S403). In this case, because the individual area may be used without authorization, the ASP server device 300 transmits an individual area deletion instruction to the management server device 500 (step S406). When access violation has not occurred (NO at step S403), a process corresponding to the request, which is received by the ASP server device 300, is performed (step S404).

In contrast, when the request from the user 100 is not received by the ASP server device 300 (NO at step S401), it is determined whether the connection proxy device 200 requests a disconnection of the session (step S402). When a disconnection of the session is requested (YES at step S402), the session between the communication device 120 and the ASP server device 300 is going to be disconnected according to the session disconnection request from the communication device 120, and the ASP server device 300 transmits a deletion instruction to the management server device 500 (step S406).

When disconnection of the session is not requested (No at step S402), it is determined whether the predetermined time period has passed since the previous request was received (step S405). When the predetermined time has not passed yet (NO at step S405), the ASP server device 300 continuously waits for a request from the user 100 (step S401). In contrast, when the predetermined time has already passed from the previous request (YES at step S405), the ASP server device 300 transmits a deletion instruction to the management server device 500 (step S406).

As described above, when the predetermined time has passed without any request from the user 100, the ASP server device 300 transmits the instruction for deleting the individual area for the user 100. Thus, if the service user leaves the terminal device 110 for a long time during a session, the individual area for the user 100 is deleted. This securely prevents the data unique to the user 100, which is stored in the individual area, from being referred to by other users.

Figure 9:
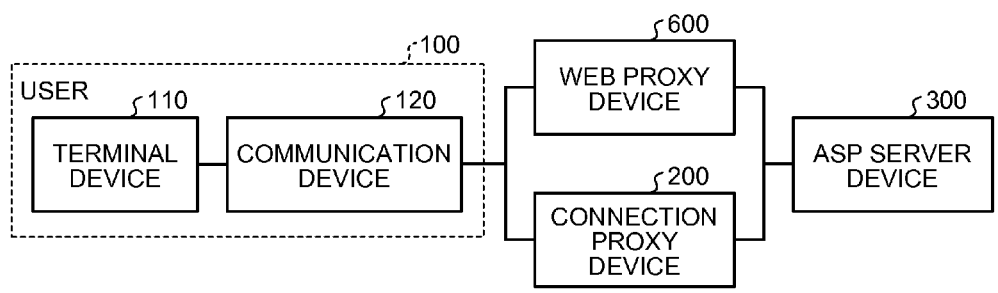
FIG. 9 is a block diagram of the overall configuration of a network according to another embodiment of the present invention.

In the embodiment, the web proxy device 400 and the management server device 500 are provided independently. However, the present invention is not limited to this configuration. As illustrated in FIG. 9, a web proxy device 600 may be configured to have functions equivalent to those of the web proxy device 400 and the management server device 500. In addition, the storage area in which each individual area for each user is allocated may be provided, not in the management server device 500 or the web proxy device 600, but in the ASP server device 300 or a server device of a service provider (not illustrated).

In the embodiment, the individual area for the user 100 is deleted when the session between the communication device 120 and the ASP server device 300 is disconnected. Alternatively, instead of deleting the individual area, the data in the individual area may be saved and the individual area may be kept unusable. In this case, the individual area that is kept unusable may be made usable once the same service user establishes a session using the same communication device 120 again.

According to the authentication apparatus, the authentication method, and the data using method that are disclosed herein, for the services on the network, data unique to service users can be used securely and reliably without reducing convenience to the service users.

According to the embodiment of the present invention, request authentication can be performed without requiring a user to perform special operations when transmitting the request. Thus, in services on a network, data unique to service users can be securely and reliably used without reducing convenience to service users.

According to the embodiment of the present invention, authorized service users can conveniently use services.

According to the embodiment of the present invention, requests from service users who can use services with authorization can be securely authenticated.

According to the embodiment of the present invention, data unique to a service user can be stored in an individual storage area and can be used securely.

According to the embodiment of the present invention, for example, a server device, with which a service provider is provided and to which many service users access, can use data unique to each service user securely.

According to the embodiment of the present invention, an individual storage area corresponding to the communication device can be allocated only while the communication device maintains the connection. This improves the convenience of services.

According to the embodiment of the present invention, request authentication can be performed without requiring a user to perform special operations when transmitting the request, and data unique to service users can be used securely. As a result, in the services on the network, data unique to service users can be securely and reliably used without reducing convenience to service users.

According to the embodiment of the present invention, the data that is stored in the individual storage area can be prevented from being used when a new connection is established using another communication device.

According to the embodiment of the present invention, even when the service user stops using a service leaving the established connection, which allows the authorized use of services, as it is, the individual storage area unique to the service user can be prevented from being used by other service users.

All examples and conditional language recited herein are intended for pedagogical purposes to aid the reader in understanding the invention and the concepts contributed by the inventor to furthering the art, and are to be construed as being without limitation to such specifically recited examples and conditions, nor does the organization of such examples in the specification relate to a showing of the superiority and inferiority of the invention. Although the embodiments of the present invention have been described in detail, it should be understood that the various changes, substitutions, and alterations could be made hereto without departing from the spirit and scope of the invention.

What is claimed is:

1. An apparatus for authenticating a request, the apparatus comprising:
   a receiving unit that receives a request which is transmitted via a communication device by a service user to request a service-related process, the request containing process request information and connection identification information, the process request information indicating the contents of the process that the service user requests and the connection identification information being unique to the communication device;
   a transmitting unit that determines whether or not the request is a login request in which the connection identification information is added to user identification information of the service user, and transmits, when the request is determined to be the login request, the user identification information contained in the login request;
   a determining unit that determines, when the request is determined not to be the login request, whether the connection identification information contained in the request exactly corresponds to connection identification information of a communication device that has established a connection that allows authorized use of the service; and
   a permitting unit that permits performing a process that corresponds to the process request information contained in the request, when the result of the determination by the determining unit indicates that the two pieces of the connection identification information exactly correspond to each other.

2. The apparatus according to claim 1, wherein the determining unit determines whether the connection identification information contained in the request and connection identification information of a communication device that a service user, who is authenticated as authorized to use the service, used for establishing a connection exactly correspond to each other.

3. The apparatus according to claim 1, wherein
   the determining unit includes
      a use permission information receiving unit that receives use permission information indicating whether a service user is permitted to use the service according to a login name and a password that has been transmitted by the service user; and
      a storage unit that stores connection identification information of a communication device that was used to transmit a login name and password by a service user who corresponds to the use permission information that indicates that the service user is permitted to use the service among the use permission information received by the use permission information receiving unit, and
   the determining unit determines whether the connection identification information contained in the request and the connection identification information stored in the storage unit exactly correspond to each other.

4. The apparatus according to claim 1, wherein, when the result of the determination by the determining unit indicates that the two pieces of the connection identification information exactly correspond to each other, the permitting unit permits performing the process using an individual storage area which is allocated to each communication device that has established a connection that allows authorized use of the service, and which stores data unique to the service user who uses the corresponding communication device.

5. The apparatus according to claim 4, wherein the transmitting unit transmits, when the process request information indicates that a process that is related to the data unique to the service user is requested, the request received by the receiving unit to a storage unit that has the individual storage areas each of which is allocated for each communication device.

6. A method for authenticating a request, the method comprising:
   receiving a request which is transmitted via a communication device by a service user to request a service-related process, the request containing process request information and connection identification information, the process request information indicating the contents of the process that the service user requests and the connection identification information being unique to the communication device;
   first determining whether or not the request is a login request in which the connection identification information is added to user identification information of the service user;
   transmitting, when the request is determined to be the login request, the user identification information contained in the login request;
   second determining, when the request is determined not to be the login request, whether the connection identification information contained in the request exactly corresponds to connection identification information of a communication device that has established a connection that allows authorized use of the service; and
   permitting performing a process that corresponds to the process request information contained in the request, when the result of the second determining indicates that the two pieces of the connection identification information exactly correspond to each other.

7. A data using method for using data for a service that is provided via connection that is established by a communication device on a network, the data using method comprising:
   securing an individual storage area that is individually associated with the communication device when the communication device establishes connection that allow authorized use of the service;
   receiving a request which is transmitted via a communication device by a service user to request a service-related process, the request containing process request information and connection identification information, the process request information indicating contents of the process that the service user requests and the connection identification information being unique to the communication device;
   first determining whether or not the request is a login request in which the connection identification information is added to user identification information of the service user;
   transmitting, when the request is determined to be the login request, the user identification information contained in the login request;
   second determining, when the request is determined not to be the login request, whether the connection identification information contained in the request exactly corresponds to connection identification information of a communication device that has established a connection that allows authorized use of the service; and
   permitting performing a process that uses data stored in the individual storage area secured at the securing, and that corresponds to the process request information contained in the request, when the result of the second determining indicates that the two pieces of the connection identification information exactly correspond to each other.

8. The data using method according to claim 7, further comprising deleting the individual storage area secured at the securing, when the communication device disconnects the connection.

9. The data using method according to claim 7, further comprising deleting an individual storage area that is associated with the communication device out of the individual storage areas, which are secured at the securing, when no process request information has been received for a predetermined time period or more from the communication device.

* * * * *